(12) United States Patent
Takasaki et al.

(10) Patent No.: US 6,785,468 B2
(45) Date of Patent: Aug. 31, 2004

(54) DISTANCE MEASUREMENT AND PHOTOMETRY APPARATUS

(75) Inventors: Minoru Takasaki, Kanagawa (JP); Takashi Ichimiya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/356,269

(22) Filed: Jan. 31, 2003

(65) Prior Publication Data

US 2003/0147638 A1 Aug. 7, 2003

(30) Foreign Application Priority Data

Feb. 4, 2002 (JP) ........................................ 2002-026259

(51) Int. Cl.$^7$ .......................... G03B 7/099; G03B 13/34
(52) U.S. Cl. .......................... 396/111; 396/98; 396/121
(58) Field of Search .......................... 396/98, 100, 111, 396/114, 121, 149

(56) References Cited

U.S. PATENT DOCUMENTS 4,774,539 A * 9/1988 Suda et al. .................. 396/114
5,302,997 A 4/1994 Cocca

* cited by examiner

*Primary Examiner*—Russell Adams
*Assistant Examiner*—Arthur A Smith
(74) *Attorney, Agent, or Firm*—Robin, Blecker & Daley

(57) ABSTRACT

Provided is a distance measurement and photometry apparatus used in a camera or the like, which sets a distance between distance measurement sensors and distance measurement light receiving lenses and a distance between a plurality of photometry sensors and photometry light receiving lenses such that a position of a region within the observation field in which information is obtained by the distance measurement sensors is equal to a position of a region within the observation field in which information is obtained by the photometry sensors irrespective of a distance to the measurement object. With this construction, it can be prevented that a distance measurement region in which the measurement object is captured and a photometry region provided corresponding to the distance measurement region are shifted with respect to each other even when the set measurement object is located at any distance.

16 Claims, 3 Drawing Sheets

DISTANCE MEASUREMENT AND PHOTOMETRY APPARATUS

BACKGROUND OF THE INVENTION

1. Field of the Invention

The present invention relates to a distance measurement and photometry apparatus suitable to an image taking device such as a camera.

2. Related Background Art

Up to now, according to an image taking device such as a camera which is provided with a distance measurement apparatus and a photometry apparatus of an external measurement type, the distance measurement apparatus is constructed as a single unit in which distance measurement accuracy is adjusted, the photometry apparatus is also constructed as a single separate unit and adjusted such that brightness can be measured with predetermined precision, and the respective apparatuses are built into the image taking device.

A distance measurement region (range) of the distance measurement apparatus is within a distance measurement area indicated in a finder, and the center of a photometry region (range) of the photometry apparatus is substantially coincided with the center of the finder. In general image taking, an object is positioned in a central portion in many cases. Thus, even in such a configuration, the suitable amount of exposure can be obtained.

Now, in order to support the case where an object is not necessarily positioned in the central portion, a multi-point distance measurement apparatus, that is, a distance measurement apparatus capable of measuring distances at a plurality of regions in both the central portion and the peripheral portion is devised and widely employed. Similarly, even in the photometry apparatus, a division photometry apparatus which is provided with a plurality of photometry sensors, divides a finder field region into a plurality of regions, and measures brightness in each of the regions is practically used.

However, as described above, the photometry region and the distance measurement region are both determined based on the finder field. Thus, from the influence of a so-called parallax, it cannot be avoided that the photometry region and the distance measurement region are shifted with respect to an object at particularly a near distance. In particular, when the distance measurement apparatus and the photometry apparatus are located at a distance, a parallax becomes larger. Therefore, there is a possibility that a distance measurement object and a photometry object are different from each other.

Also, up to now, the determination of whether or not an object is in a backlight state is possible only in the case where the object exists in the central portion. Thus, if it is determined that the object exists outside the central portion, it is difficult to determine a backlight state from the above reason.

SUMMARY OF THE INVENTION

According to one characteristic of the present invention, there is provided a distance measurement and photometry apparatus which sets a distance between distance measurement sensors and distance measurement light receiving lenses and a distance between a plurality of photometry sensors and photometry light receiving lenses such that a position of a region within the observation field in which information is obtained by the distance measurement sensors is equal to a position of a region within the observation field in which information is obtained by the photometry sensors irrespective of a distance to the measurement object, and which can prevent that a distance measurement region in which the measurement object is captured and a photometry region provided corresponding to the distance measurement region are shifted even when the set measurement object is located at any distance.

DESCRIPTION OF THE PREFERRED EMBODIMENTS

Hereinafter, an embodiment of the present invention will be described in detail with reference to the drawings.

Figure 1:
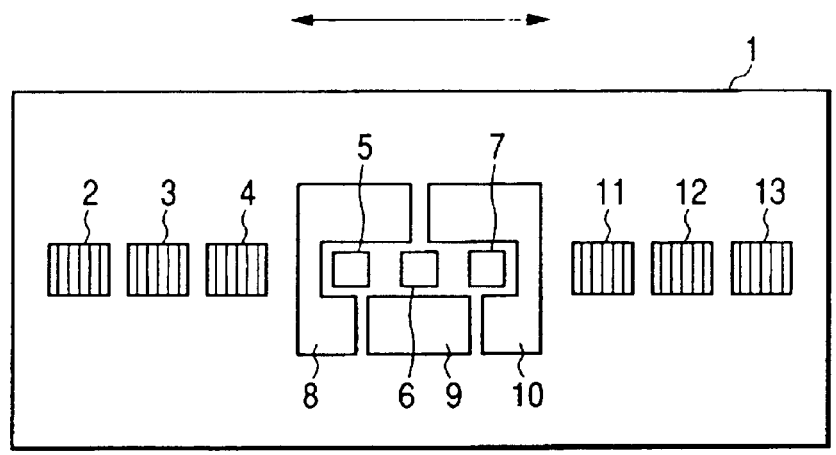
FIG. 1 shows a semiconductor element in which sensors and the like of a distance measurement and photometry apparatus are integrally formed according to an embodiment of the present invention.

FIG. 1 shows a semiconductor element in which sensors and the like of a distance measurement and photometry apparatus are integrally formed according to an embodiment of the present invention In the drawing, reference numeral 1 denotes a semiconductor element of a single chip which is provided with plural pairs of distance measurement sensors each composed of a photoelectric conversion element and a plurality of photometry sensors each composed of a photoelectric conversion element. The semiconductor element includes: a distance measurement signal processing circuit for outputting as an object image signal used for distance measurement operation an output current from each of the plural pairs of distance measurement sensors to an external circuit; and a brightness signal processing circuit for outputting as a photometry value corresponding to the brightness of an object an output current from each of the plurality of photometry sensors to the external circuit.

Reference numerals 2, 3, and 4 each denote one sensor composing a pair of distance measurement sensors. Of them, the sensor 3 is used for distance measurement to the central portion of a finder field and the sensors 2 and 4 are each used for distance measurement to left and right regions. Reference numerals 11, 12, and 13 each denote the other sensor composing the pair of distance measurement sensors. Similarly, the sensor 12 is used for distance measurement to the central portion of the finder field and the sensors 11 and 13 are used for distance measurement to the left and right regions. The distance measurement operation or calculation is conducted using signal outputs from the respective distance measurement sensors. In the distance measurement operation to the central region, an output signal of the sensor 3 and that of the sensor 12 are used. Similarly, in the distance measurement operation to the left and right regions, a distance to an object is obtained by comparing between sensor output signals from the sensors 2 and 11 and between sensor output signals from the sensors 4 and 13. The detail of the distance measurement operation is omitted here. The output currents of the respective distance measurement sensors are led to a distance measurement signal processing circuit which is not shown.

Reference numerals 5, 6, 7, 8, 9, and 10 denote photometry sensors each composed of a photoelectric conversion element. The photometry is conducted for the finder field region using the six respective sensors. Note that output currents of the respective sensors are led to a brightness signal processing circuit which is not shown.

The plural pairs of distance measurement sensors 2, 3, 4, 11, 12, and 13 and the plurality of photometry sensors 5, 6, and 7 are arranged on a straight line in a base line longitudinal direction indicated by an arrow in FIG. 1. Although described later, the photometry sensors 5 and 7 are used for conducting photometry to a region overlapped with the left and right distance measurement regions and the photometry sensor 6 is used for conducting photometry to a region overlapped with the central distance measurement region.

Figure 3:
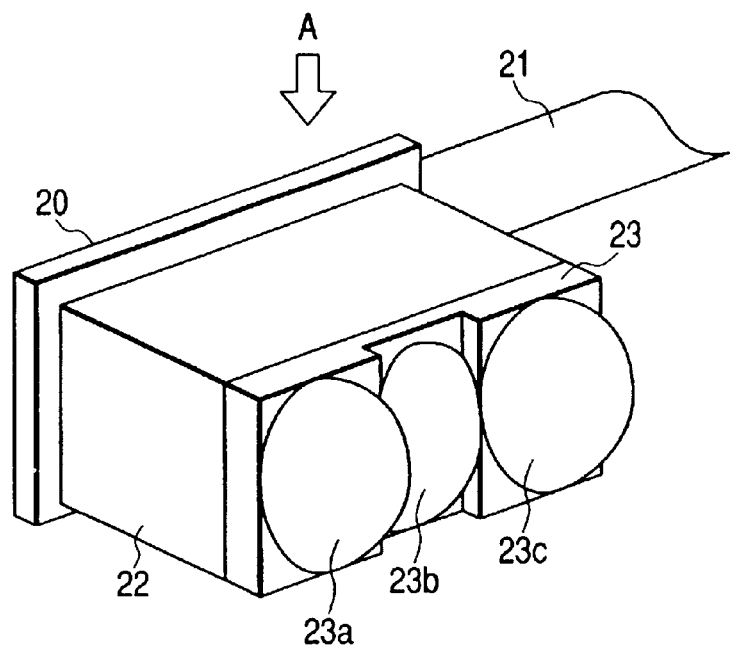
FIG. 3 is a perspective view showing an outline of the distance measurement and photometry apparatus shown in FIG. 1.
Figure 4:
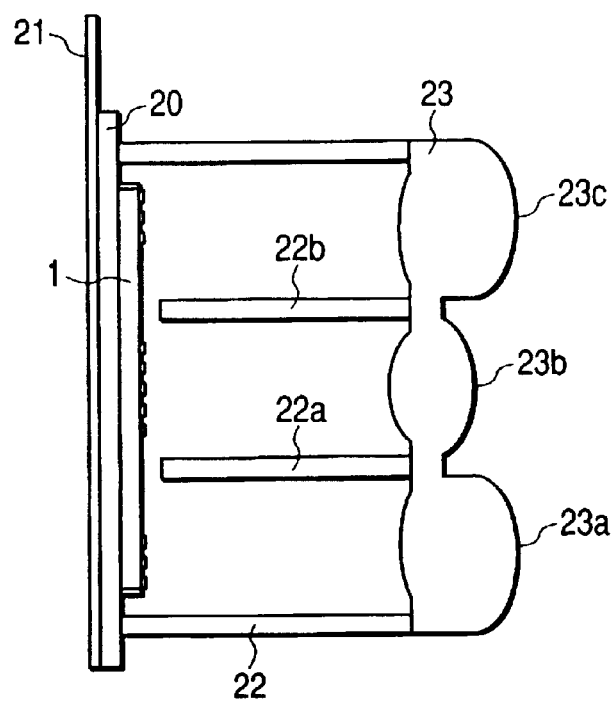
FIG. 4 is a cross sectional view as seen from a direction of A in FIG. 3.

An outline of a distance measurement and photometry apparatus constructed by incorporating the plural pairs of distance measurement sensors and the plurality of photometry sensors thereinto is shown in FIG. 3, and a cross sectional view from a direction of A in FIG. 3 is FIG. 4.

In these drawings, reference numeral 20 denotes a substrate for holding a semiconductor element 1. The substrate 20 and the semiconductor element 1 are bonded to each other. In addition, the semiconductor element 1, a power source for driving the semiconductor element 1, and signal lines are connected with a pattern of the substrate 20 by bonding or other methods. Reference numeral 21 denotes a flexible substrate for connecting an external circuit which is not shown with the power source and the signal lines. The flexible substrate 21 is connected with the substrate 20 by soldering. Reference numeral 22 denotes a distance measurement and photometry block which holds the substrate 20 by bonding, in which walls 22a and 22b for limiting incident paths to the respective distance measurement sensors and the respective photometry sensors are provided in an inner portion thereof.

Figure 2:
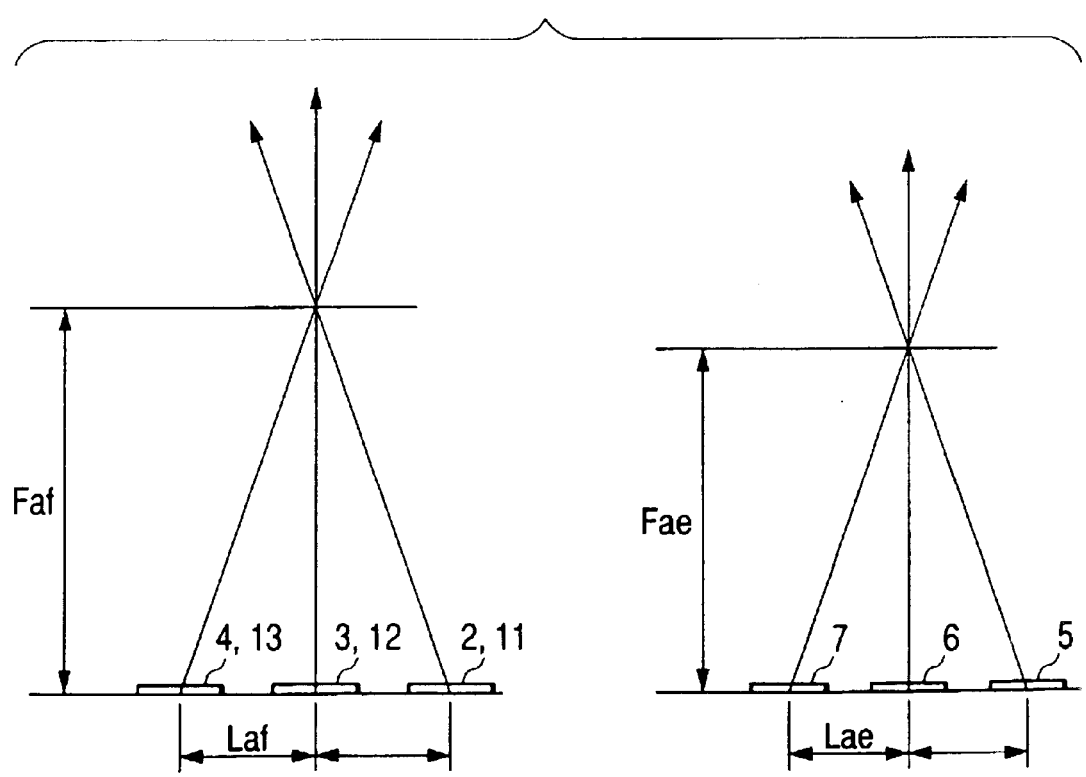
FIG. 2 shows relationship among distances between sensors and sizes of light receiving lenses in FIG. 1.

Reference numeral 23 denotes an integrally constructed light receiving lens which is composed of distance measurement light receiving lenses 23a and 23c which correspond to the plural pairs of distance measurement sensors and have the same aperture area and a photometry light receiving lens 23b corresponding to the plurality of photometry sensors. These light receiving lenses are each a convex lens. Focal distances of the lenses 23a and 23c are the same. Adjustment is conducted such that the distance measurement sensors 3 and 12 of the plural pairs of distance measurement sensors are disposed on the optical axes of those lenses. Further, as shown in FIG. 2, respective distances from principal points of those lenses to the semiconductor element 1 (the plural pairs of distance measurement sensors) in optical axis directions are kept to a predetermined value Faf. Focal distances of the distance measurement light receiving lenses 23a and 23c and the predetermined value Faf are substantially same (Exactly, Faf>Focal distances of the distance measurement light receiving lenses 23a and 23c). On the other hand, a optical axis of the photometry light receiving lens 23b coincides with the center of the photometry sensor 6 of the plurality of photometry sensors, and a distance from a principal point of the lens to the semiconductor element 1 (the plurality of photometry sensors) in an optical axis direction is kept to the predetermined value Fae. A Focal distance of the photometry light receiving lenses 23b and the predetermined value Fae are substantially same (Fae>Focal distance of the photometry light receiving lenses 23b).

Also, as shown in FIG. 2, when respective distances from the optical axes of the distance measurement light receiving lenses 23a and 23c to the centers of the left and right distance measurement sensors (sensors 2 and 4 or sensors 11 and 13) in a base line direction are taken as Laf and when respective distances from the optical axes of the light receiving lens 23b to the centers of the photometry sensors 5 and 7 in the base line direction are taken as Lae, they are located such that the following equation is satisfied.

$$Faf/Laf = Fae/Lae$$

When the above equation is satisfied, the central portions of the distance measurement regions in a right-left direction and the central portions of the photometry regions in the right-left direction have the same angle. Note that, even if (Faf/Laf) and (Fae/Lae) are not strictly equal to each other, a difference therebetween is preferably within a practicable predetermined value. In other words, even in not only the central potion but also the right and left peripheral regions, that is, even in the distance measurement region of the pair of distance measurement sensors 2 and 11 and the photometry region of the photometry sensor 5 and in the distance measurement region of the pair of distance measurement sensors 4 and 13 and the photometry region of the photometry sensor 7, these central positions in a finder field becomes equal to or substantially equal to each other. Thus, a shift amount can be kept to a predetermined value or less.

According to the distance measurement and photometry apparatus with such a configuration, the plurality of photometry sensors are each located between one of the plural pairs of distance measurement sensors and the other thereof and arranged on a straight line. Thus, those parallaxes can be almost neglected with respect to each other. Therefore, irrespective of a distance to an object, the center of the photometry region coincides with that of each of the distance measurement regions in the finder field as shown in FIG. 5.

Figure 5:
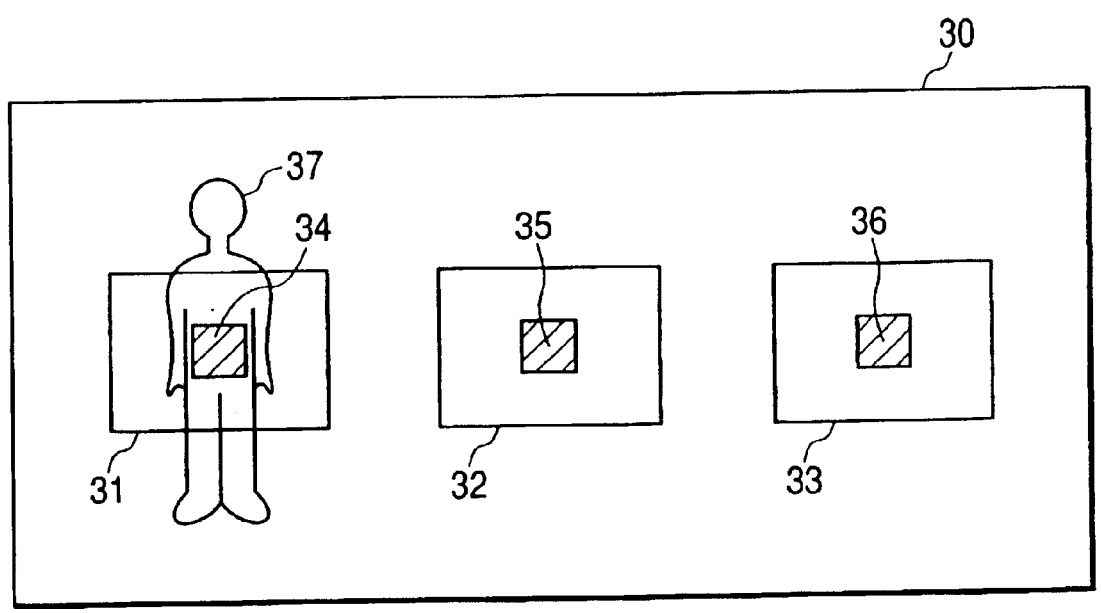
FIG. 5 shows distance measurement regions and photometry regions in a finder field in the embodiment of the present invention.

In FIG. 5, reference numeral 30 denotes a finder field. An operator determines a composition based on this field and conducts image-taking. Reference numeral 31 denotes a left side distance measurement region for which distance measurement is conducted using a combination of the distance measurement sensors 2 and 11. Each of the sensors converts an image substantially on the region into a current and outputs it. Reference numeral 32 denotes a central distance measurement region for which distance measurement is conducted using a combination of the distance measurement sensors 3 and 12. Reference numeral 33 denotes a right side distance measurement region for which distance measurement is conducted using a combination of the distance measurement sensors 4 and 13. Reference numeral 34 denotes a left side photometry region for which the photometry sensor 5 measures brightness, 35 denotes a central photometry region for which the photometry sensor 6 measures brightness, and 36 denotes a right side photometry region for which the photometry sensor 7 measures brightness. Reference numeral 37 denotes a main object.

When the distance measurement and photometry apparatus described here is incorporated in a camera, distance measurement operation is conducted by an external circuit (not shown) mounted in the camera to calculate a distance to the object which exists in each of the distance measurement regions. Thus, for example, it is determined that the main object exists in a region in which a nearest distance is indicated. In this case, the photometry region is also set to the object and its periphery so that the suitable amount of exposure can be determined for the object even in a condition of a strong contrast. In FIG. 5, when the external circuit determines the amount of exposure to a film or the like using signal outputs of the photometry sensors 5 and 8, the suitable amount of exposure can be provided to the object.

Also, in FIG. 5, in the case of backlight detection, an output signal of the photometry sensor 5 for measuring the brightness of the object is compared with output signals of the photometry sensors 8, 9, and 10 for measuring the brightness of the peripheral portion. If the brightness of the peripheral portion is equal to or larger than a predetermined value, a backlight state is determined. Thus, the external circuit which is not shown operates means for correcting the amount of exposure by, for example, the emission of additional light such as a flash.

According to the above-mentioned embodiment, a so-called parallax problem in that the distance measurement region and the corresponding photometry region are shifted can be solved so that the brightness of the object can be accurately measured. Thus, the suitable amount of exposure can be provided to a film or a light receiving element such as a CCD. More specifically, information related to an accurate distance and reasonable photometry information can be provided to even an object located at a near distance. In other words, when a main object is recognized from a distance measurement result, control can be conducted such that the suitable amount of exposure is obtained in its location.

In particular, the plurality of photometry sensors and the plural pairs of distance measurement sensors are located adjacent to each other as in the position relationships shown in FIG. 2. Thus, a so-called parallax is extremely small so that the photometry region and the distance measurement region can be coincided with each other in even an object located at a far distance to a near distance.

Also, when the brightness of the main object is compared with that of its periphery, even in the case where the main object exists outside the central portion, whether or not it is in a backlight state can be determined.

Specific constitutions will be listed and described. The plurality of distance measurement light receiving lenses 23*a* and 23*c* have the same aperture area and the same focal distance. The optical axes of the plurality of distance measurement light receiving lenses 23*a* and 23*c* cross the pair of distance measurement sensors 3 and 12 which are located in the central portion of the plural pairs of distance measurement sensors. In addition, the respective distances Faf from principal points of the distance measurement light receiving lenses 23*a* and 23*c* to the pair of distance measurement sensors 3 and 12 (2 and 11 or 4 and 13) in optical axis directions are made equal to the focal distances of the distance measurement light receiving lenses 23*a* and 23*c* or set to a slightly far distance. On the other hand, the optical axis of the photometry light receiving lens 23*b* crosses the photometry sensor 6 of the plurality of photometry sensors 5 to 10, which is located in the central portion. In addition, the distance Fae from the principal point of the photometry light receiving lens 23*b* to the photometry sensor 6 (5 or 7) in the optical axis direction is set to a distance equal to the focal distance of the photometry light receiving lens 23*b* (or to a farther distance than the focal distance by a predetermined value). Then, it is constructed such that (Laf/Faf) indicating the relationship between the respective distances Laf in the base line direction from the pair of distance measurement sensors 2 and 11 (4 and 13) which are located in the peripheral portions of the plural pairs of distance measurement sensors to the optical axes of the plurality of distance measurement light receiving lenses 23*a* and 23*c* and the above-mentioned distance Faf, is equal to or substantially equal to (Lae/Fae) indicating the relationship between the respective distances Lae in the base line direction from the plurality of photometry sensors 5 and 7 located in the peripheral portions of the plurality of photometry sensors 5 to 10 to the center of the photometry sensor 6 located in the central portion (corresponding to the optical axis of the photometry light receiving lens 23*b*) and the distance Fae from the principal points of the plurality of distance measurement light receiving lenses 23*a* and 23*c* to the center of the center of the photometry sensor 6 located in the central portion.

MODIFIED EXAMPLE

According to the above-mentioned embodiment, the case where the distance measurement sensors and the distance measurement light receiving lenses are provided in order to measure distance information related to the object is described as an example. Further, the case where information related to a distance to the object is measured, that is, the case where focal point detection information is measured is included in the embodiment.

Also, the example in which the present invention is applied to the image taking device is described. However, the present invention can be similarly applied to the case of an optical device having a distance measurement (focal point detection) function and a photometry function.

Also, according to the above-mentioned embodiment, the example in which the plurality of distance measurement sensors and the plurality of photometry sensors are provided in the base line direction, that is, the example in which the plurality of distance measurement regions and the plurality of photometry regions are provided is described. However, the present invention is not limited to such an example. Thus, an apparatus having a plurality of distance measurement regions and a plurality of photometry regions in a direction perpendicular to the base line direction, an apparatus having a combination of those, or the like may be used. Further, the number of regions is not limited to that described in the embodiment.

What is claimed is:

1. A distance measurement and photometry apparatus comprising:

plural pairs of distance measurement sensors for obtaining information related to a distance in each of a plurality of distance measurement regions within an observation field;

a plurality of photometry sensors located between the plural pairs of distance measurement sensors to obtain information related to brightness on each of a plurality of photometry regions provided to overlap with the plurality of distance measurement regions;

a pair of distance measurement light receiving lenses for forming an image of a measurement object on the plural pairs of distance measurement sensors; and a photometry light receiving lens located between the pair of distance measurement light receiving lenses to form an image of the measurement object on the plurality of photometry sensors, wherein a distance between the plural pairs of distance measurement sensors and the pair of distance measurement light receiving lenses and a distance between the plurality of photometry sensors and the photometry light receiving lens are set such that a position of a region within the observation field in which information is obtained by the distance measurement sensors is equal to a position of a region within the observation field in which information is obtained by the photometry sensors irrespective of a distance to the measurement object.

2. A distance measurement and photometry apparatus according to claim 1, wherein the plurality of photometry sensors are each located between one of the plural pairs of distance measurement sensors and the other thereof and arranged on a base line of the plural pairs of distance measurement sensors.

3. A distance measurement and photometry apparatus according to claim 2, wherein the plural pairs of distance measurement sensors and the plurality of photometry sensors are arranged on a straight line.

4. A distance measurement and photometry apparatus according to claim 1, wherein the pair of distance measurement light receiving lenses each have an equal aperture area and an equal focal distance.

5. A distance measurement and photometry apparatus according to claim 1, wherein optical axes of the pair of distance measurement light receiving lenses cross distance measurement sensors corresponding to a central distance measurement region within the observation field, of the plural pairs of distance measurement sensors.

6. A distance measurement and photometry apparatus according to claim 1, wherein optical axes of the pair of photometry light receiving lenses cross a photometry sensor corresponding to a central photometry region within the observation field, of the plurality of photometry sensors.

7. A distance measurement and photometry apparatus according to claim 1, wherein the plural pairs of distance measurement sensors and the plurality of photometry sensors are provided on a same semiconductor chip.

8. A distance measurement and photometry apparatus comprising:
 plural pairs of distance measurement sensors for obtaining information related to a distance in each of a plurality of distance measurement regions within an observation field;
 a plurality of photometry sensors located between the plural pairs of distance measurement sensors to obtain information related to brightness on each of a plurality of photometry regions provided to overlap with the plurality of distance measurement regions;
 a pair of distance measurement light receiving lenses for forming an image of a measurement object on the plural pairs of distance measurement sensors; and
 a photometry light receiving lens located between the pair of distance measurement light receiving lenses to form an image of the measurement object on the plurality of photometry sensors,
 wherein a distance between the plural pairs of distance measurement sensors and the pair of distance measurement light receiving lenses and a distance between the plurality of photometry sensors and the photometry light receiving lens are set such that a position of a region within the observation field in which information is obtained by the distance measurement sensors is shifted by a predetermined amount or less with respect to a position of a region within the observation field in which information is obtained by the photometry sensors irrespective of a distance to the measurement object.

9. A distance measurement and photometry apparatus comprising:
 plural pairs of distance measurement sensors for obtaining information related to a distance in each of a plurality of distance measurement regions within an observation field;
 a plurality of photometry sensors located between the plural pairs of distance measurement sensors to obtain information related to brightness on each of a plurality of photometry regions provided to overlap with the plurality of distance measurement regions;
 a pair of distance measurement light receiving lenses for forming an image of a measurement object on the plural pairs of distance measurement sensors; and
 a photometry light receiving lens located between the pair of distance measurement light receiving lenses to form an image of the measurement object on the plurality of photometry sensors,
 wherein in a pair of distance measurement sensors and a photometry sensor with respective regions within the observation field for obtaining information being overlapped with each other, a ratio between a distance from principal points of the pair of distance measurement light receiving lenses to a surface on which the plural pairs of distance measurement sensors are located and a distance from optical axes of the pair of distance measurement light receiving lenses to the pair of distance measurement sensors is equal to a ratio between a distance from a principal point of the photometry light receiving lens to a surface on which the plurality of photometry sensors are located and a distance from an optical axis of the photometry light receiving lens to the photometry sensor.

10. A distance measurement and photometry apparatus comprising:
 plural pairs of distance measurement sensors for obtaining information related to a distance in each of a plurality of distance measurement regions within an observation field;
 a plurality of photometry sensors located between the plural pairs of distance measurement sensors to obtain information related to brightness on each of a plurality of photometry regions provided to overlap with the plurality of distance measurement regions;
 a pair of distance measurement light receiving lenses for forming an image of a measurement object on the plural pairs of distance measurement sensors; and
 a photometry light receiving lens located between the pair of distance measurement light receiving lenses to form an image of the measurement object on the plurality of photometry sensors,
 wherein in a pair of distance measurement sensors and a photometry sensor with respective regions within the observation field for obtaining information being overlapped with each other, a ratio between a distance from principal points of the pair of distance measurement light receiving lenses to a surface on which the plural pairs of distance measurement sensors are located and a distance from optical axes of the pair of distance measurement light receiving lenses to the pairs of distance measurement sensors is different by a predetermined value or less from a ratio between a distance from a principal point of the photometry light receiving lens to a surface on which the plurality of photometry sensors are located and a distance from an optical axis of the photometry light receiving lens to the photometry sensor.

11. A distance measurement and photometry apparatus according to claim 10, wherein the plurality of photometry sensors are each located between one of the plural pairs of distance measurement sensors and the other thereof and arranged on a base line of the plural pairs of distance measurement sensors.

12. A distance measurement and photometry apparatus according to claim 11, wherein the plural pairs of distance measurement sensors and the plurality of photometry sensors are arranged on a straight line.

13. A distance measurement and photometry apparatus according to claim 10, wherein the pair of distance measurement light receiving lenses each have an equal aperture area and an equal focal distance.

14. A distance measurement and photometry apparatus according to claim 10, wherein optical axes of the pair of distance measurement light receiving lenses cross distance measurement sensors corresponding to a central distance measurement region within the observation field, of the plural pairs of distance measurement sensors.

15. A distance measurement and photometry apparatus according to claim 10, wherein optical axes of the pair of photometry light receiving lenses cross a photometry sensor corresponding to a central photometry region within the observation field, of the plurality of photometry sensors.

16. A distance measurement and photometry apparatus according to claim 10, wherein the plural pairs of distance measurement sensors and the plurality of photometry sensors are provided on a same semiconductor chip.

* * * * *